(12) United States Patent
Ganesan et al.

(10) Patent No.: US 7,065,787 B2
(45) Date of Patent: Jun. 20, 2006

(54) PUBLISHING CONTENT IN CONNECTION WITH DIGITAL RIGHTS MANAGEMENT (DRM) ARCHITECTURE

(75) Inventors: Krishnamurthy Ganesan, Redmond, WA (US); Pratul Dublish, Sammamish, WA (US); Sandeep Sahasrabudhe, Kirkland, WA (US); Clifford Paul Strom, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 937 days.

(21) Appl. No.: 10/170,791

(22) Filed: Jun. 12, 2002

(65) Prior Publication Data

US 2003/0233561 A1    Dec. 18, 2003

(51) Int. Cl.
*G06F 12/14* (2006.01)
*H04L 9/08* (2006.01)

(52) U.S. Cl. .......................................... 726/21; 705/59
(58) Field of Classification Search .................. 726/21, 726/17
See application file for complete search history.

(56) References Cited

U.S. PATENT DOCUMENTS

| | | | | |
|---|---|---|---|---|
| 5,715,403 | A | 2/1998 | Stefik | 705/44 |
| 6,289,452 | B1 | 9/2001 | Arnold et al. | 713/175 |
| 6,920,567 | B1 * | 7/2005 | Doherty et al. | 726/22 |
| 2002/0013772 | A1 | 1/2002 | Peinado | 705/51 |
| 2002/0019814 | A1 * | 2/2002 | Ganesan | 705/59 |
| 2003/0028488 | A1 * | 2/2003 | Mohammed et al. | 705/59 |
| 2003/0187801 | A1 * | 10/2003 | Chase et al. | 705/59 |

FOREIGN PATENT DOCUMENTS

| | | |
|---|---|---|
| WO | WO 98/42098 | 9/1998 |
| WO | WO 00/58811 | 10/2000 |
| WO | WO 00/59150 | 10/2000 |
| WO | WO 01/52021 A1 | 7/2001 |
| WO | WO 01/95175 | 12/2001 |
| WO | WO 02/01330 A2 | 1/2002 |

OTHER PUBLICATIONS

Evans, P. DRM; is the road to adoption fraught with potholes? [Digital Rights Management], *Seybold Report Analyzing Publishing Technologies*, Oct. 22, 2001, 1(14), p. 32.
Kohl, U., et al. "Safeguarding digital library contents and users", *D-Lib Magazine*, 1997.

(Continued)

*Primary Examiner*—Matthew Smithers
(74) *Attorney, Agent, or Firm*—Woodcock Washburn LLP (57) ABSTRACT

A packager packages digital content for a user and a licensor issues a digital license to the user for the content such that the user renders the content only in accordance with the license. The licensor and packager share a Secret to allow the packager and the licensor to calculate a content key (KD) for the content. To package the content for the user, the packager calculates a content key (KD) based on the shared Secret and a content ID and encrypts the content according to (KD). To issue a license to the user for the content, the licensor also calculates (KD) based on the shared Secret and the content ID, encrypts (KD) according to a public key of the user to form the license, and sends the license to the user.

30 Claims, 8 Drawing Sheets

OTHER PUBLICATIONS

Secor, G.M. "Legal aspects of electronic publishing: look both ways before crossing the street", *Acquisitions Librarian*, 1996, 15, 95-110.

"Managing digital rights in online publishing", *Information Management & Technology*, 2001, 34(4), 168-169.

Griswold, G.N. "A Method for Protecting Copyright on Networks", *IMA Intellectual Property Project Proceedings*, 1994, 1(1), 169-178.

Kahn, R.E. "Deposit, Registration and Recordation in an Electronic Copyright Management System", *IMA Intellectual Property Project Proceedings*, 1994, 1(1), 111-120.

\* cited by examiner

| PROVISIONING LICENSE 16 |
|---|
| (PU-PA2(KD-PROV)) |
| CONTENT ID W/ LICENSOR URL |
| USAGE RULES |

FIG. 5

| PROVISIONING CONTENT 12 |
|---|
| CONTENT ID W/ LICENSOR URL |
| (PU-PA1) S (PR-LI), CERT. CHAIN |
| (KD-PROV(SECRET)) |
| (KD-PROV(PR-PA1)) |

| LICENSE 16 |
| --- |
| (PU-US(KD)) |
| CONTENT ID |
| USAGE RULES |
| (PU-LI) |
| (S (PR-LI)) |

FIG. 10

| PACKAGED CONTENT 13 |
| --- |
| (KD(CONTENT 12)) |
| RIGHTS LABEL 72 |
| - CONTENT ID |
| - (PU-PA1) |
| - LICENSOR URL |
| - USAGE RULES |
| - S (PR-PA1), CERT. CHAIN |

PUBLISHING CONTENT IN CONNECTION WITH DIGITAL RIGHTS MANAGEMENT (DRM) ARCHITECTURE

TECHNICAL FIELD

The present invention relates to an architecture for enforcing rights in digital content. More specifically, the present invention relates to such an enforcement architecture that allows access to encrypted digital content only in accordance with parameters specified by license rights acquired by a user of the digital content. Even more specifically, the present invention relates to such an architecture that is particularly useful in connection with publishing content.

BACKGROUND OF THE INVENTION

Figure 1:
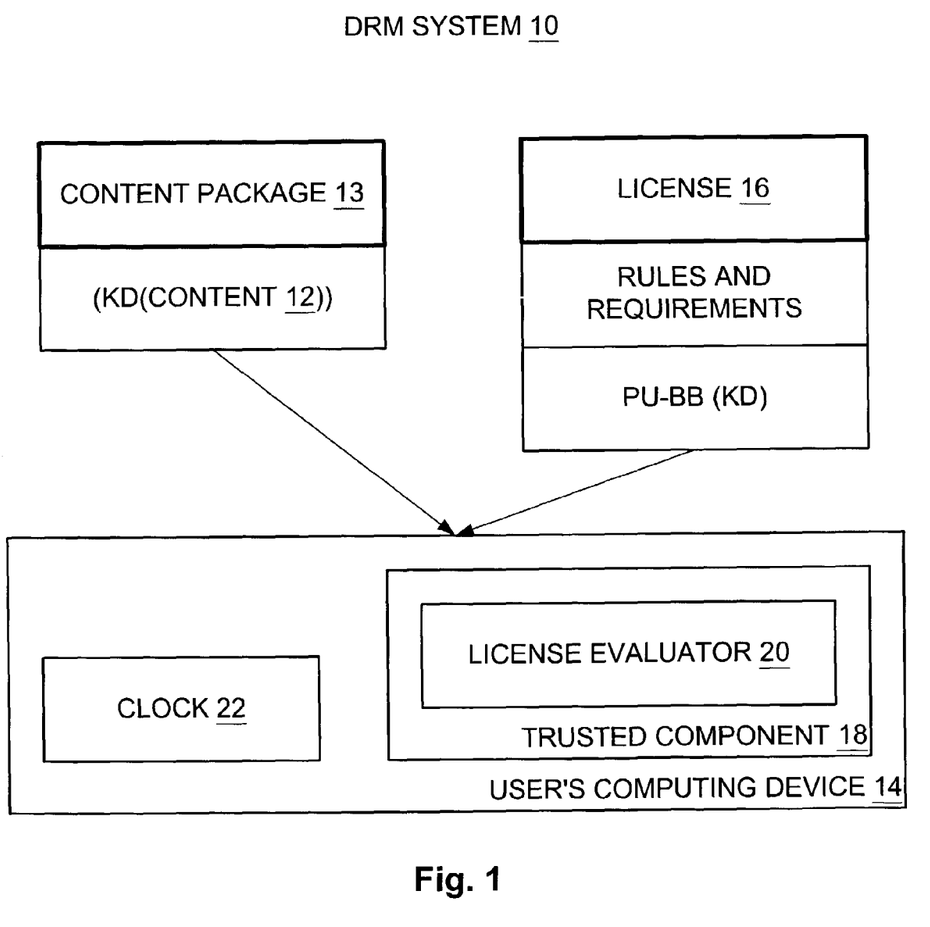
FIG. 1 is a block diagram showing an enforcement architecture of an example of a trust-based system.

As is known, and referring now to FIG. 1, digital rights management (DRM) and enforcement system is highly desirable in connection with digital content 12 such as digital audio, digital video, digital text, digital data, digital multimedia, etc., where such digital content 12 is to be distributed to users. Upon being received by the user, such user renders or 'plays' the digital content with the aid of an appropriate rendering device such as a media player on a personal computer 14 or the like.

Typically, a content owner distributing such digital content 12 wishes to restrict what the user can do with such distributed digital content 12. For example, the content owner may wish to restrict the user from copying and redistributing such content 12 to a second user, or may wish to allow distributed digital content 12 to be played only a limited number of times, only for a certain total time, only on a certain type of machine, only on a certain type of media player, only by a certain type of user, etc.

However, after distribution has occurred, such content owner has very little if any control over the digital content 12. A DRM system 10, then, allows the controlled rendering or playing of arbitrary forms of digital content 12, where such control is flexible and definable by the content owner of such digital content. Typically, content 12 is distributed to the user in the form of a package 13 by way of any appropriate distribution channel. The digital content package 13 as distributed may include the digital content 12 encrypted with a symmetric encryption/decryption key (KD), (i.e., (KD(CONTENT))), as well as other information identifying the content, how to acquire a license for such content, etc.

The trust-based DRM system 10 allows an owner of digital content 12 to specify license rules that must be satisfied before such digital content 12 is allowed to be rendered on a user's computing device 14. Such license rules can include the aforementioned temporal requirement, and may be embodied within a digital license 16 that the user/user's computing device 14 (hereinafter, such terms are interchangeable unless circumstances require otherwise) must obtain from the content owner or an agent thereof. Such license 16 also includes the decryption key (KD) for decrypting the digital content, perhaps encrypted according to a key decryptable by the user's computing device.

The content owner for a piece of digital content 12 must trust that the user's computing device 14 will abide by the rules and requirements specified by such content owner in the license 16, i.e. that the digital content 12 will not be rendered unless the rules and requirements within the license 16 are satisfied. Preferably, then, the user's computing device 14 is provided with a trusted component or mechanism 18 that will not render the digital content 12 except according to the license rules embodied in the license 16 associated with the digital content 12 and obtained by the user.

The trusted component 18 typically has a license evaluator 20 that determines whether the license 16 is valid, reviews the license rules and requirements in such valid license 16, and determines based on the reviewed license rules and requirements whether the requesting user has the right to render the requested digital content 12 in the manner sought, among other things. As should be understood, the license evaluator 20 is trusted in the DRM system 10 to carry out the wishes of the owner of the digital content 12 according to the rules and requirements in the license 16, and the user should not be able to easily alter such trusted element for any purpose, nefarious or otherwise.

As should be understood, the rules and requirements in the license 16 can specify whether the user has rights to render the digital content 12 based on any of several factors, including who the user is, where the user is located, what type of computing device the user is using, what rendering application is calling the DRM system, the date, the time, etc. In addition, the rules and requirements of the license 16 may limit the license 16 to a pre-determined number of plays, or pre-determined play time, for example.

The rules and requirements may be specified in the license 16 according to any appropriate language and syntax. For example, the language may simply specify attributes and values that must be satisfied (DATE must be later than X, e.g.), or may require the performance of functions according to a specified script (IF DATE greater than X, THEN DO . . . , e.g.).

Upon the license evaluator 20 determining that the license 16 is valid and that the user satisfies the rules and requirements therein, the digital content 12 can then be rendered. In particular, to render the content 12, the decryption key (KD) is obtained from the license 16 and is applied to (KD (CONTENT)) from 30 the content package 13 to result in the actual content 12, and the actual content 12 is then in fact rendered.

In a DRM system 10, content 12 is packaged for use by a user by encrypting such content 12 and associating a license 16 having a set of rules with the content 12, whereby the content 12 can be rendered only in accordance with the rules in the license 16. Because the content 12 requires the license 16 for access thereto, then, the content 12 may be freely distributed. Accordingly, to package content 12 for publishing in accordance with the DRM system 10, a packager and a licensor must exchange information such that the packager can package DRM content 12 for which the licensor can issue a corresponding license 16. More particularly, a need exists for a method and mechanism by which a licensor can 'provision' a packager to package content for publishing, by which the packager in fact packages the content for publishing, and by which a license for the packaged content is obtained by a user.

SUMMARY OF THE INVENTION

In one embodiment of the present invention, a packager packages digital content for a user and a licensor issues a digital license to the user for the content such that the user renders the content only in accordance with the license. To provision the packager to package the content for the user, the licensor upon receiving a provisioning request from the packager generates a Secret to be shared with the packager.

The shared Secret allows the packager and the licensor to calculate a content key (KD) for the content.

The licensor generates a random content key (KD-PROV), and encrypts the Secret according to (KD-PROV) to form (KD-PROV(Secret)). The licensor signs a public key of the packager (PU-PA1) with a private key of the licensor (PR-LI) to certify same ((PU-PA1) S (PR-LI)), and sends (KD-PROV(Secret)), (PU-PA1) S (PR-LI), and any associated certificate chain to the packager.

In one embodiment of the present invention, the packager as provisioned has provisioning content from the licensor including (KD-PROV(Secret)), and a provisioning license from the licensor including (KD-PROV) encrypted according to a public key of the packager (PU-PA2) ((PU-PA2 (KD-PROV))). To package the content for the user, the packager selects the provisioning license and provisioning content from the licensor, obtains (PU-PA2(KD-PROV)) from the provisioning license, applies a corresponding private key of the packager (PR-PA2) to (PU-PA2(KD-PROV)) to result in (KD-PROV), obtains (KD-PROV(Secret)) from the provisioning content, and applies (KD-PROV) to (KD-PROV(Secret)) to result in the shared Secret.

The packager then generates a random content ID for the content, calculates a content key (KD) based on the random content ID and the Secret, and encrypts the content according to (KD) ((KD(Content))). Thereafter, the packager obtains a provisioning content ID having an identifier of the licensor from one of the provisioning license and the provisioning content, appends to (KD(Content)) the random content ID, a public key of the packager (PU-PA1), and the identifier of the licensor to form the packaged content, and distributes the packaged content to the user.

In one embodiment of the present invention, the packaged content as possessed by the user includes (KD(Content)), the content ID, and (PU-PA1). To issue a license to the user for the content, the licensor receives a request including the content ID, (PU-PA1), and a public key associated with the user (PU-US) that is to be employed to bind the license to the user. The licensor obtains based on (PU-PA1) stored provisioning information regarding the packager including the shared Secret, calculates (KD) based on the content ID received with the request and the obtained Secret, and encrypts (KD) according to (PU-US) as received with the request ((PU-US(KD))). The licensor then appends to (PU-US(KD)) the content ID to form the license, and sends the license to the user.

BRIEF DESCRIPTION OF THE DRAWINGS

The foregoing summary, as well as the following detailed description of the embodiments of the present invention, will be better understood when read in conjunction with the appended drawings. For the purpose of illustrating the invention, there are shown in the drawings embodiments which are presently preferred. As should be understood, however, the invention is not limited to the precise arrangements and instrumentalities shown. In the drawings.

DETAILED DESCRIPTION OF THE INVENTION

Computer Environment

FIG. 1 and the following discussion are intended to provide a brief general description of a suitable computing environment in which the present invention and/or portions thereof may be implemented. Although not required, the invention is described in the general context of computer-executable instructions, such as program modules, being executed by a computer, such as a client workstation or a server. Generally, program modules include routines, programs, objects, components, data structures and the like that perform particular tasks or implement particular abstract data types. Moreover, it should be appreciated that the invention and/or portions thereof may be practiced with other computer system configurations, including hand-held devices, multi-processor systems, microprocessor-based or programmable consumer electronics, network PCs, mini-computers, mainframe computers and the like. The invention may also be practiced in distributed computing environments where tasks are performed by remote processing devices that are linked through a communications network. In a distributed computing environment, program modules may be located in both local and remote memory storage devices.

Figure 2:
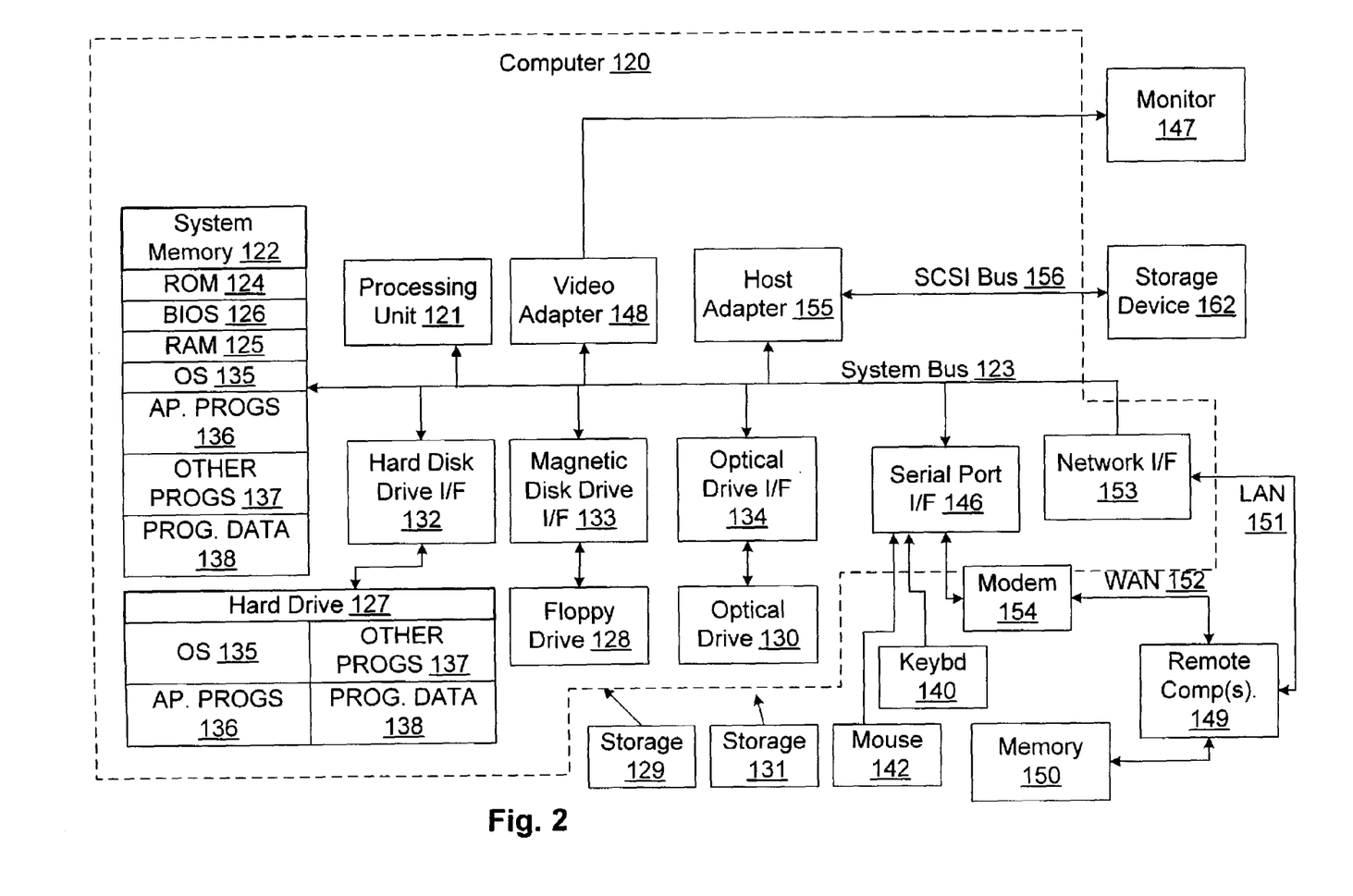
FIG. 2 is a block diagram representing a general purpose computer system in which aspects of the present invention and/or portions thereof may be incorporated.

As shown in FIG. 2, an exemplary general purpose computing system includes a conventional personal computer 120 or the like, including a processing unit 121, a system memory 122, and a system bus 123 that couples various system components including the system memory to the processing unit 121. The system bus 123 may be any of several types of bus structures including a memory bus or memory controller, a peripheral bus, and a local bus using any of a variety of bus architectures. The system memory includes read-only memory (ROM) 124 and random access memory (RAM) 125. A basic input/output system 126 (BIOS), containing the basic routines that help to transfer information between elements within the personal computer 120, such as during start-up, is stored in ROM 124.

The personal computer 120 may further include a hard disk drive 127 for reading from and writing to a hard disk (not shown), a magnetic disk drive 128 for reading from or writing to a removable magnetic disk 129, and an optical disk drive 130 for reading from or writing to a removable optical disk 131 such as a CD-ROM or other optical media. The hard disk drive 127, magnetic disk drive 128, and optical disk drive 130 are connected to the system bus 123 by a hard disk drive interface 132, a magnetic disk drive interface 133, and an optical drive interface 134, respectively. The drives and their associated computer-readable media provide non-volatile storage of computer readable instructions, data structures, program modules and other data for the personal computer 20.

Although the exemplary environment described herein employs a hard disk, a removable magnetic disk 129, and a removable optical disk 131, it should be appreciated that other types of computer readable media which can store data that is accessible by a computer may also be used in the exemplary operating environment. Such other types of media include a magnetic cassette, a flash memory card, a digital video disk, a Bernoulli cartridge, a random access memory (RAM), a read-only memory (ROM), and the like.

A number of program modules may be stored on the hard disk, magnetic disk 129, optical disk 131, ROM 124 or RAM 125, including an operating system 135, one or more application programs 136, other program modules 137 and program data 138. A user may enter commands and information into the personal computer 120 through input devices such as a keyboard 140 and pointing device 142. Other input devices (not shown) may include a microphone, joystick, game pad, satellite disk, scanner, or the like. These and other input devices are often connected to the processing unit 121 through a serial port interface 146 that is coupled to the system bus, but may be connected by other interfaces, such as a parallel port, game port, or universal serial bus (USB). A monitor 147 or other type of display device is also connected to the system bus 123 via an interface, such as a video adapter 148. In addition to the monitor 147, a personal computer typically includes other peripheral output devices (not shown), such as speakers and printers. The exemplary system of FIG. 2 also includes a host adapter 155, a Small Computer System Interface (SCSI) bus 156, and an external storage device 162 connected to the SCSI bus 156.

The personal computer 120 may operate in a networked environment using logical connections to one or more remote computers, such as a remote computer 149. The remote computer 149 may be another personal computer, a server, a router, a network PC, a peer device or other common network node, and typically includes many or all of the elements described above relative to the personal computer 120, although only a memory storage device 150 has been illustrated in FIG. 2. The logical connections depicted in FIG. 2 include a local area network (LAN) 151 and a wide area network (WAN) 152. Such networking environments are commonplace in offices, enterprise-wide computer networks, intranets, and the Internet.

When used in a LAN networking environment, the personal computer 120 is connected to the LAN 151 through a network interface or adapter 153. When used in a WAN networking environment, the personal computer 120 typically includes a modem 154 or other means for establishing communications over the wide area network 152, such as the Internet. The modem 154, which may be internal or external, is connected to the system bus 123 via the serial port interface 146. In a networked environment, program modules depicted relative to the personal computer 120, or portions thereof, may be stored in the remote memory storage device. It will be appreciated that the network connections shown are exemplary and other means of establishing a communications link between the computers may be used.

Publishing Content

As disclosed thus far, the DRM architecture 10 controls access to digital content 12 by encrypting and packaging the content 12 and allowing access to the content 12 only in accordance with a set of rules in a corresponding license 16. However, it is to be appreciated that the DRM architecture 10 as set forth above is somewhat involved. Especially in the area of publishing, where an individual wishes to publish content 12 within the framework of the DRM architecture 10, such architecture 10 may be somewhat modified as set forth below to enable such personal packaging and publishing in a simplified and economical manner. Of course, any packager/publisher may employ the architecture 10 set forth below without departing from the spirit and scope of the present invention.

As set forth below, publishing of content 12 and consumption of the published content 12 in connection with the DRM architecture 10 requires: (1) that a licensor 'provision' a publisher or the like to package content 12 for publishing; (2) that the packager in fact packages the content 12 for publishing; and (3) that the packaged content 13 as published be rendered by a user at a computing device 14 based on a license 16 obtained from the licensor. Each of the aforementioned will be dealt with in turn.

Provisioning a Packager to Package Content

Figure 3:
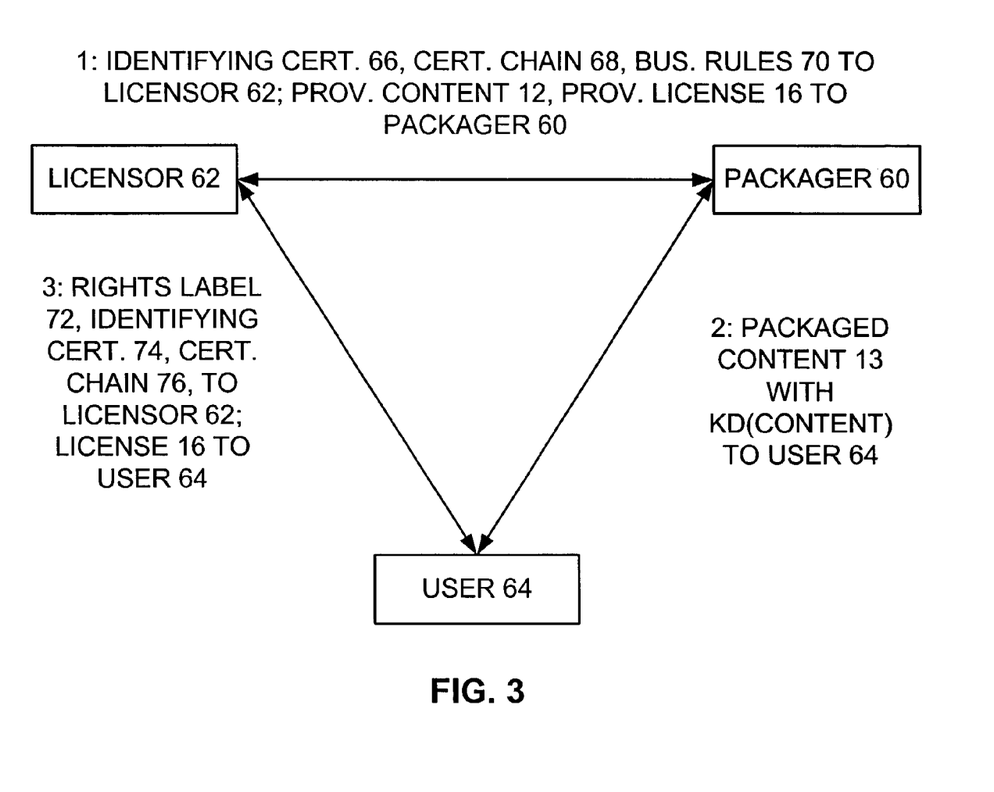
FIG. 3 is a block diagram showing interaction between a licensor, a packager, and a user in the course of the licensor provisioning the packager to package content, the packager packaging the content and delivering same to the user, and the user obtaining a license for the packaged content in accordance with one embodiment of the present invention.

In one embodiment of the present invention, and referring now to FIG. 3, prior to actually publishing content 12, a packager 60 and a licensor 62 must exchange information such that the packager 60/publisher can publish content 12 for consumption by a user 64 at a computing device 14, and such that the licensor 62 can issue a license 16 to the user 64 for rendering the content 12. Put another way, the licensor 62 must 'provision' the packager. Note here that the packager 60 of the content 12 may be the publisher of such content 12 or may be separate from such publisher. In the embodiment, provisioning is based on a Secret that is shared between the packager 60 and licensor 62 and a public private key pair associated with the packager 60 (PU-PA1, PR-PA1).

As is typical, the key pair (PU-PA1, PR-PA1) is employed by the packager 60 to identify itself, to encrypt and decrypt, and to create a signature. The shared Secret between the licensor and the packager allows each to calculate a content key (KD) for a piece of content 12. The calculation can be based on any algorithm agreed upon by both the licensor and the packager without departing from the spirit and scope of the present invention. In one embodiment of the present invention, the content key (KD) for a piece of content 12 having a content ID is obtained from a hash of the content ID and the Secret, such as for example a hash based on the SHA algorithm:

Content Key (KD)=SHA(Content ID, Secret)

Figure 4:
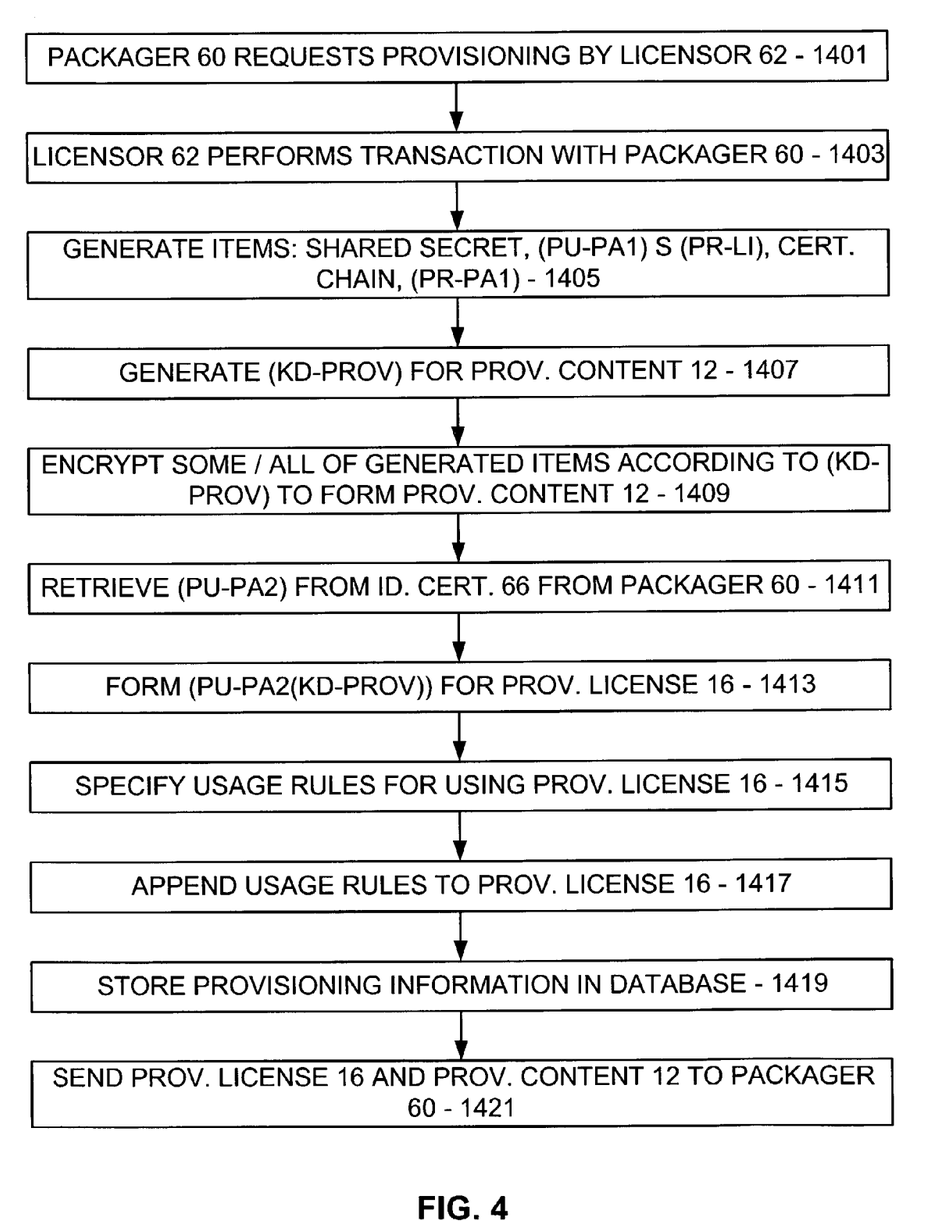
FIG. 4 is a flow diagram showing steps performed by the licensor and packager of FIG. 3 in the course of provisioning the packager to package content in accordance with one embodiment of the present invention.

In one embodiment of the present invention, and turning now to FIG. 4, provisioning is performed as follows. Preliminarily, the packager 60 requests that the licensor 62 provision such packager 60 (step 1401). The request may take any particular form without departing from the spirit and scope of the present invention, but at a minimum includes an identifying certificate 66 and an associated certificate chain 68. As explained in more detail below, the identifying certificate 66 in particular includes a public key associated with the packager 60 (PU-PA2) that is to be employed to bind a license 16 to the packager 60, where the packager 60 also has a corresponding private key (PR-PA2).

Note that (PU-PA2, PR-PA2) may be different from (PU-PA1, PR-PA1) or the same as (PU-PA1, PR-PA1). Ideally, however, the pairs of keys should be distinct. In particular, and as is conventional, (PR-PA2) should be accessible only by the trusted component 18, and should never be made available externally.

In addition, the request can include proposed business rules 70. As may be appreciated, the business rules 70 are the conditions under which a user 64 is to be granted a license 16 for content 12 packaged by the packager 60. Such rules 70 may for example specify that the content be rendered only a set number of times, a set number of days, etc. The licensor 62 typically has the discretion to agree to the business rules 70 or to require modifications thereto.

Upon receiving the request, the licensor 62 may first perform any transaction with the packager 60 that the licensor 62 deems appropriate (step 1403). For example, the licensor 62 could require the packager 60 to start a subscription, pay a fee, etc. The licensor 62 could also authenticate the identity of the packager 60 through any available mechanism.

In response to the request, the licensor 62 begins provisioning the packager 60 by generating items specific to such packager 60 (step 1405). Specifically, the licensor 62 generates the aforementioned shared Secret. In addition, it may be the case that the licensor 62 generates the key pair (PU-PA1, PR-PA1) for the packager 60 at this point. If so, the licensor 62 signs (PU-PA1) with a private key (PR-LI) to certify same (i.e., (PU-PA1) S (PR-LI)).

Of course, the packager 60 may object to the licensor 62 knowing (PR-PA1). If so, the Packager obtains the key pair (PU-PA1, PR-PA1) from another source, sends (PU-PA1) to the licensor as part of the request at step 1401, and the licensor 62 signs the sent (PU-PA2) with a private key (PR-LI) to certify same (i.e., (PU-PA1) S (PR-LI)).

The generated shared Secret, (PU-PA1) S (PR-LI), an associated certificate chain for (PU-PA1) S (PR-LI), and (PR-PA1) if generated by the licensor 62 are to be sent to the packager 60 by such licensor 62, and at least some of such items must be received and retained by the packager 60 in a secure manner. Accordingly, in one embodiment of the present invention, such items are sent in the form of a piece of DRM content 12, which in this case is provisioning content 12. Note that the provisioning content 12 is a special form of content 12 in that such provisioning content 12 is in effect rendered only to divulge the items therein.

In particular, the licensor generates a random content key (KD-PROV) for the provisioning content 12 (step 1407), and then encrypts one or more of such items (Secret, (PU-PA1) S (PR-LI), certificate chain, and (PR-PA1)) according to (KD-PROV) to form such provisioning content 12 (step 1409). Note that all of such items may be encrypted to form the provisioning content 12, or only select ones of such items may be so encrypted. In the latter case, and for example, only Secret and (PR-PA1) are so encrypted, and (PU-PA1) S (PR-LI) and the certificate chain are appended to the encrypted provisioning content 12 as a header or the like.

As should be appreciated, for the provisioning content 12 to be 'rendered' by the packager 60 and a trusted component 18 thereof, a corresponding provisioning license 16 is required. Accordingly, the licensor generates such a provisioning license by retrieving (PU-PA2) from the identifying certificate 66 that accompanied the request in step 1401 (step 1411), and encrypting (KD-PROV) with (PU-PA2) to form (PU-PA2(KD-PROV)) (step 1413).

Note that the provisioning license 16 and the provisioning content 12 both should have a content ID. Accordingly, the licensor 62 generates such a content ID and appends same to both the provisioning license 16 and the provisioning content 12. Such content ID may be any appropriate content ID without departing from the spirit and scope of the present invention. For example, the content ID may be an identifier of the licensor 62, such as a URL thereof. Note, though, that if the licensor 62 is to generate multiple sets of provisioning licenses 16 and provisioning content 12 for the packager 60, each set should have a unique content ID. Accordingly, and in such a case, the content ID may also be based on the URL of the licensor 62 and additional information.

It is to be appreciated that the licensor 62 may wish to constrain the ability of the packager 60 to package content 12. For example, the licensor 60 may wish to have the packager 60 pay a fee each time such content 12 is packaged thereby. In one embodiment of the present invention, then, the provisioning license 16 is a rich license that can include an abundant set of usage rules that apply to the packager 62. Accordingly, and in such a case, the licensor specifies particular usage rules for using the provisioning license 16 (step 1415), and appends same to the provisioning license 16 (step 1417).

In one embodiment of the present invention, the licensor 62 maintains a record of at least some of the information incumbent in the provisioning license 16 and the provisioning content 12. Typically, such provisioning information is stored in a database or the like (step 1419), and is used when constructing a license 16 for a user 64 based on content 12 packaged by the packager 60 in accordance with the provisioning license 16 and the provisioning content 12, as will be disclosed in more detail below.

Figure 5:
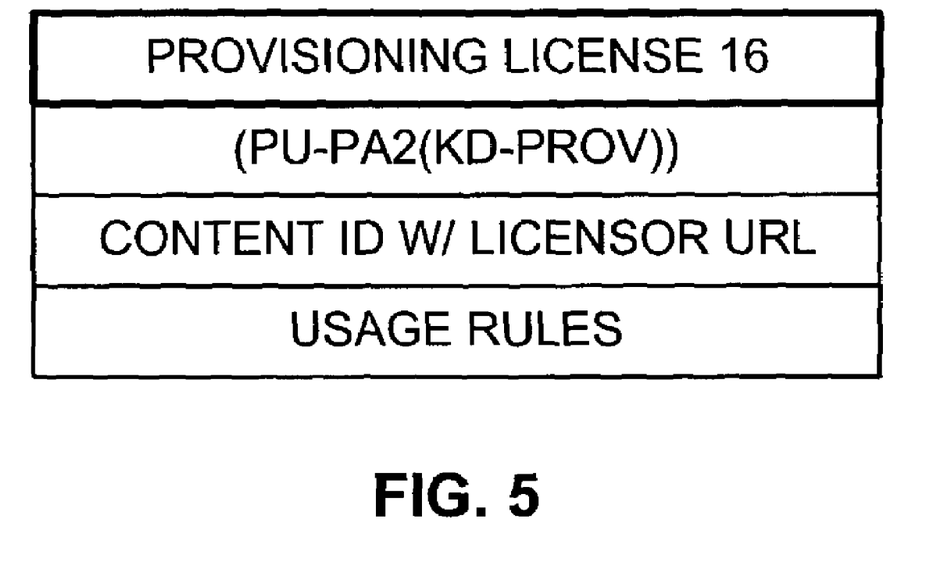
FIGS. 5 and 6 respectively are block diagrams showing a provisioning license and provisioning content resulting from the process of FIG. 4 as obtained by the packager from the licensor in accordance with one embodiment of the present invention.
Figure 6:
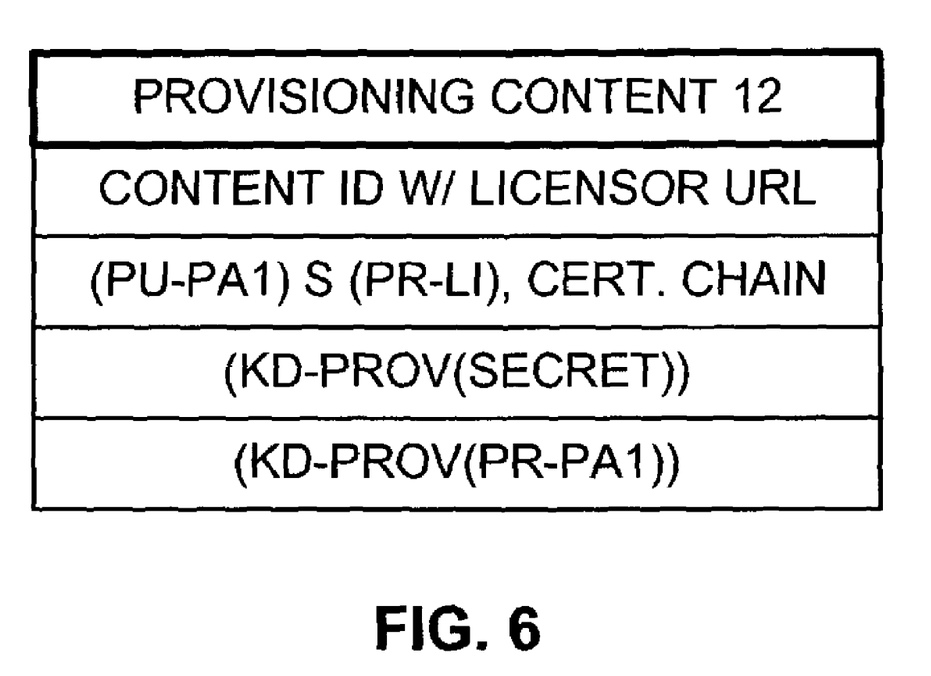

Once the licensor 62 has finished constructing the provisioning license 16 and the provisioning content 12, and assuming any transaction details as at step 1403 have been concluded, the licensor 62 then sends the provisioning license 16 and the provisioning content 12 to the packager 60 and the packager 60 appropriately stores same (step 1421) in a license store and content store of a trusted component 18 thereof, respectively. Such a provisioning license 16 and piece of provisioning content 12 are shown in FIGS. 5 and 6, respectively.

Packaging Content at the Packager

Figure 7:
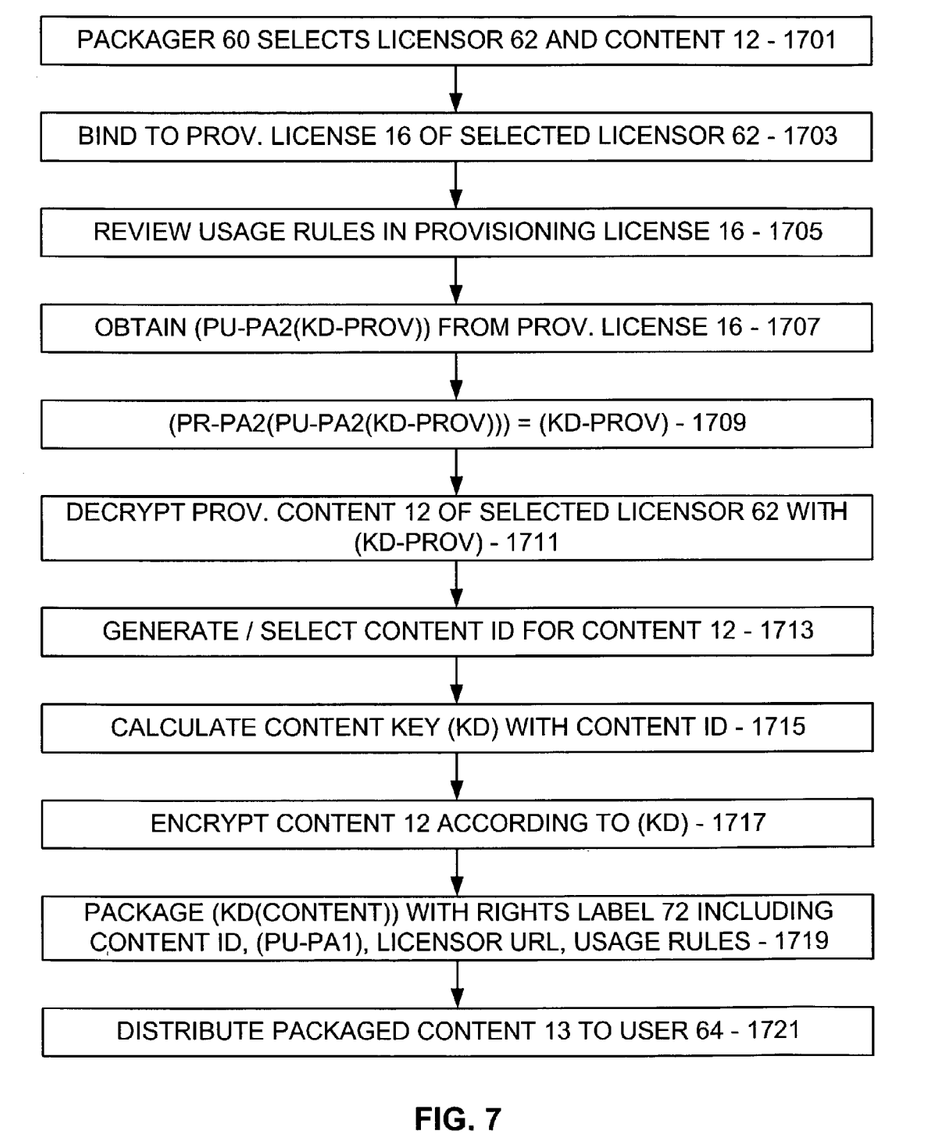
FIG. 7 is a flow diagram showing steps performed by the packager of FIG. 3 in the course of packaging the content and delivering same to the user in accordance with one embodiment of the present invention.

Turning now to FIG. 7, once a packager 60 is provisioned with a provisioning license 16 and a provisioning content 12 such as those shown in FIGS. 5 and 6, such packager 60 can package content 12 as packaged content 13 and distribute same, as follows. Note that packaging may be performed in response to a request for the content 12 from a user 64, or may be performed to have content 12 available should a user 64 request same.

Preliminarily, the packager 60 selects a licensor 62 to issue licenses 16 for the to-be-packaged content 12 (step 1701). Presumably, multiple licensors 62 are available for use by the packager 60, and the packager 60 has at least one set of a provisioning license 16 and provisioning content 12 for each available licensor 62.

Once the licensor 62 is selected and a set of a provisioning license 16 and provisioning content 12 from the licensor 62 is selected (assuming more than one exists), the packager binds to the selected provisioning license 16. That is, the packager 60 has a trusted component 18 operating on a computing device 14 of such packager 60, and the packager 60 requests that the trusted component 18 make available the provisioning content key (KD-PROV) from such selected provisioning license 16 (step 1703). Accordingly, the trusted component 18 reviews any usage rules in the selected provisioning license 16 and makes a determination based on such usage rules and any other rules on whether the provisioning content key (KD-PROV) can be made available (step 1705).

Assuming the provisioning content key (KD-PROV) is to be made available, the trusted component 18 in fact obtains such (KD-PROV) by obtaining (PU-PA2(KD-PROV)) from the license 16 (step 1707), and applying (PR-PA2) thereto to result in (KD-PROV) (step 1709). Note that (PR-PA2) may be the private key of the black box 30 of the trusted component 18 (PR-BB), or may be the private key of another key pair. Such another key pair may for example be a key pair owned by the packager 60 and available to the trusted component 18 and the black box 30 thereof.

With (KD-PROV), the packager 60/trusted component 18 decrypts the encrypted contents of the selected provisioning content 12 corresponding to the selected provisioning license 16 (step 1711). Accordingly, the content ID including the URL of the licensor 62, the Secret, (PU-PA1) S (PR-LI), the certificate chain, and (PR-PA1) are available, and (PU-PA1) is made available by traversing the certificate chain to obtain (PU-LI) and applying same to (PU-PA1) S (PR-LI) to verify (PU-PA1). Alternatively, if the packager 60 already knows (PU-PA1) and (PR-PA1), the Secret, (PU-PA1) S (PR-LI), and the certificate chain are available from the provisioning content, the certificate chain is traversed to obtain (PU-LI) and verify (PU-PA1) S (PR-LI).

Based on having the content ID including the URL of the licensor 62, the Secret, (PU-PA1), and (PR-PA1), the packager 60 then can package the content 12. In particular, the packager 60 generates or selects a content ID for the content 12 to be packaged (step 1713), calculates a content key (KD) such as for example by applying the random content ID and the Secret to:

Content Key (KD)=SHA(Content ID, Secret)

(step 1715), and then encrypts the content 12 according to (KD) to result in (KD(Content)) (step 1717). Note that the content ID could be random or nonrandom, and in fact can be an identifier such as for example an ISBN number for a book, a docket number for a document, etc.

In one embodiment of the present invention, the packaged content 13 includes the encrypted content 12 (KD(Content)) and a rights label having meta-data relevant to the encrypted content 12. In particular, in the embodiment, the packager 60 packages (KD(Content)) with a rights label 72 including the content ID, (PU-PA1), the URL of the licensor 62, and usage rules specifying how the user 64 can render the content 12 as packaged (step 1719). The rights label 72 or at least a portion thereof should be signed by (PR-PA1) to prevent unauthorized tampering therewith. Note that the usage rules in the rights label 72 can be in addition to or instead of the business rules 70 included with the request in step 1401, above.

Figure 8:
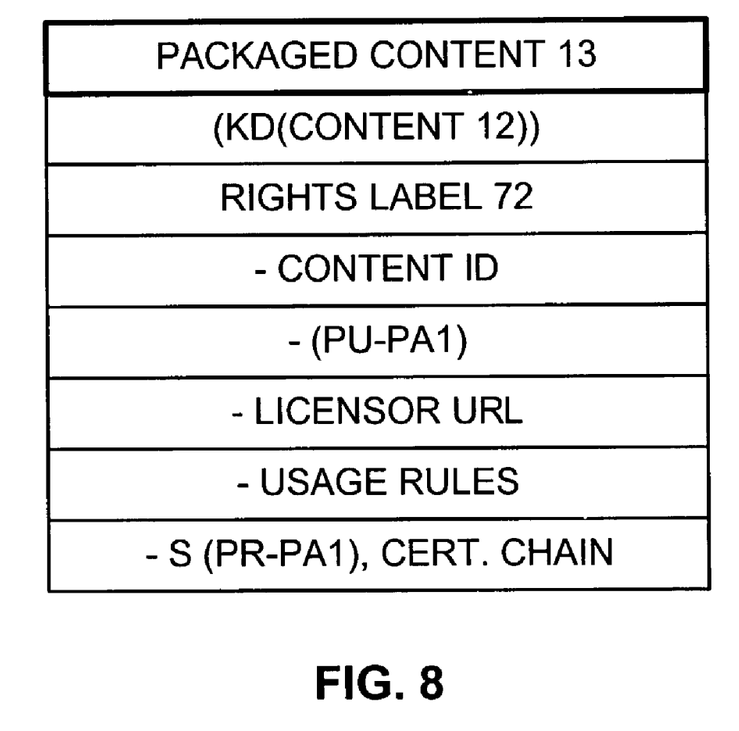
FIG. 8 is a block diagram showing the content resulting from the process of FIG. 7 as obtained by the user from the packager in accordance with one embodiment of the present invention.

After the content 12 has been encrypted and packaged with a rights label 72, such packaged content 13 may then be distributed to a user 64 (step 1721). As should be appreciated, the packaged content 13 upon being distributed does not as yet have any license 16 corresponding thereto. Such packaged content 12 is shown in FIG. 8.

Notably, a packager 60 can decrypt any self-packaged content 12 using only the provisioning license 16, the provisioning content 12, and the content ID in a manner akin to that set forth in FIG. 7 to calculate the content key (KD) for the content 12. Thus, the packager can discard the unencrypted content 12 after being packaged without impacting the packager's ability to access the packaged content 13. In particular, the packager 60 need not obtain a license 16 from the licensor 62 for the content 12. At a later time, if the packager 60 wants to access the self-packaged content 12, for example to edit the content 12, such packager 60 can do so by locating the provisioning license for the licensor URL specified in the packaged content 13 (FIG. 8), obtaining the shared secret and computing (KD) (FIG. 7), and decrypting the packaged content 13 using (KD).

In the process set forth in connection with FIG. 7, the provisioning content key (KD-PROV) is divulged to the packager 60. Significantly, if an unauthorized user were to gain access to the computing device 14 of the packager 60, such unauthorized user could conceivably obtain (KD-PROV) and employ same to obtain the shared Secret and (PR-PA1). In one embodiment of the present invention, then, the trusted component 18 on the computing device 14 of the packager 60 takes the provisioning license 16 and the provisioning content 12 as input, extracts (KD-PROV), employs same to extract the shared Secret from the provisioning content 12, and then packages the content 12, all without allowing the packager 60 or any other individual to see (KD-PROV) or any other secrets or keys employed.

Obtaining a License from the Licensor by the User

When a user 64 after obtaining the packaged content 13 attempts to render same, the user 64 is directed to obtain a valid license from the licensor 62 in a manner akin to that described above. In particular, and turning now to FIG. 9, the license 16 for the packaged content 13 is obtained from the licensor 62 in the following manner.

Figure 9:
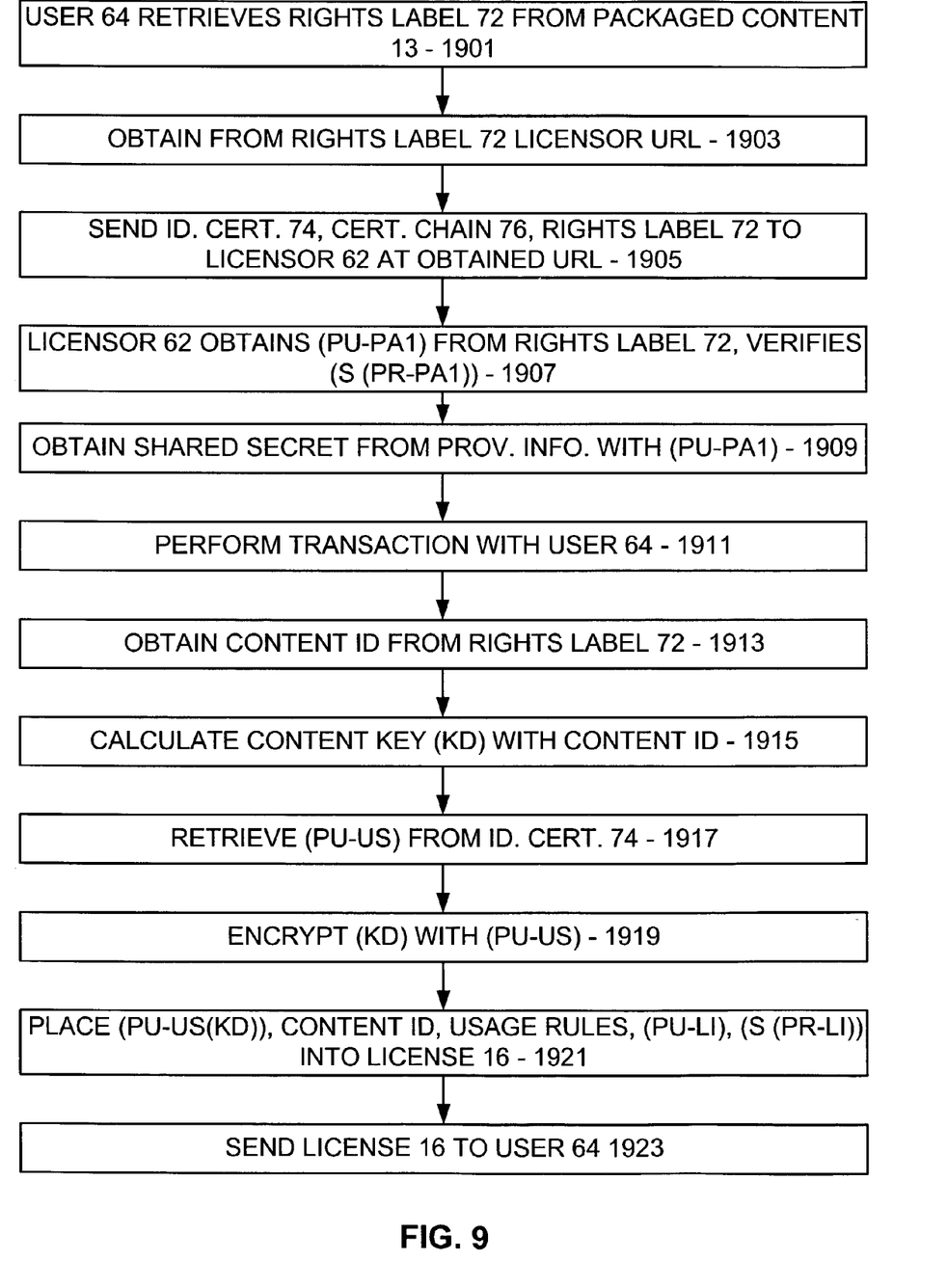
FIG. 9 is a flow diagram showing steps performed by the licensor and user of FIG. 3 in the course of the user obtaining a license for the packaged content in accordance with one embodiment of the present invention.

Preliminarily, the user 64 at a computing device 14 having a trusted component 18 thereon retrieves the rights label 72 packaged with the encrypted content 12 (step 1901), and obtains from the rights label 72 the URL of the licensor 62 (step 1903). The user 64 then sends an identifying certificate 74, an associated certificate chain 76, and the rights label 72 to the licensor 62 at the obtained URL thereof (step 1905) to request a license 16 for the content 12. Similar to the identifying certificate 66, the identifying certificate 74 includes a public key associated with the user 64 (PU-US) that is to be employed to bind the license 16 to the user 64, where the user 64 also has a corresponding private key (PR-US). Note that (PU-US, PR-US) may be the public and private keys of the black box 30 of the trusted component 18 of the computing device 14 of the user 64 (PU-BB, PR-BB), or may be the public and private keys of another key pair. Such another key pair may for example be a key pair owned by the user 64 and available to the trusted component 18 and the black box 30 thereof.

The licensor 62 upon receiving the request from the user 64 including the identifying certificate 74, the associated certificate chain 76, and the rights label 72 obtains (PU-PA1) from the rights label 72 and based thereon verifies the signature (S(PR-PA1)) of such rights label 72 with the obtained (PU-PA1) (step 1907). Assuming the signature verifies, the licensor 62 then obtains based on (PU-PA1) information regarding the packager 60 as was stored as provisioning information at step 1419. In particular, the licensor 62 obtains the shared Secret from such provisioning information (step 1909).

At some point, the licensor 62 may also perform any transaction with the user 64 that the licensor 62 deems appropriate (step 1911). For example, the licensor 62 could require the user 64 to start a subscription, pay a fee, etc. The licensor 62 could also authenticate the identity of the user 64 through any available mechanism. As may be appreciated, the transaction may be based in part on the usage rules in the rights label 72, the business rules 70 included with the request in step 1401, above, or based on other rules.

Assuming the transaction is completed, the licensor 62 then issues a license 16 corresponding to the content 12 to the user 64. In particular, the Licensor obtains the Content ID from the rights label 72 (step 1913), calculates the content key (KD) for the content based on the same calculation performed by the packager 60, such as for example by applying the obtained content ID and the Secret to:

Content Key (KD)=SHA(Content ID, Secret)

(step 1915), and then generates a license 16 with the content key (KD) by retrieving (PU-US) from the identifying certificate 74 that accompanied the request in step 1905) (step 1917), and encrypting (KD) with (PU-US) to form (PU-US (KD)) (step 1919). In addition, the licensor 62 places in the license 16 the content ID for the content 12 as obtained from the rights label 72 and the usage rules for using the content 16 as obtained from the rights label 72 (step 1921). The license 16 as constructed or at least a portion thereof may be signed by a private key of the licensor 62 (S (PR-LI)), and the license may be provided with the corresponding (PU-LI) to verify same.

Figure 10:
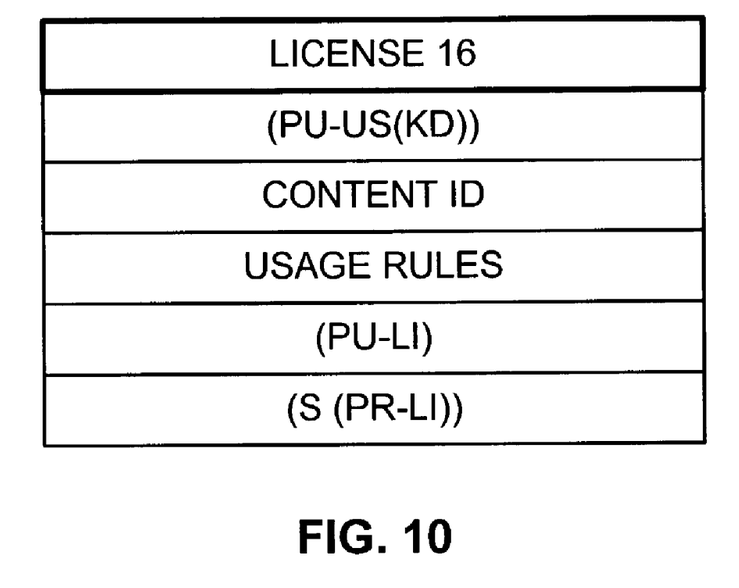
FIG. 10 is a block diagram showing the license resulting from the process of FIG. 9 as obtained by the user from the licensor in accordance with one embodiment of the present invention.

Once the licensor 62 has finished constructing the license 16, the licensor 62 then sends the license 16 to the user 64 and the user 64 appropriately stores same (step 1923) in a license store 38 of the trusted component 18 thereof. Such a license 16 is shown in FIG. 10. The user 64 can now render the content 12 under the conditions set forth in the license 16.

CONCLUSION

The programming necessary to effectuate the processes performed in connection with the present invention is relatively straight-forward and should be apparent to the relevant programming public. Accordingly, such programming is not attached hereto. Any particular programming, then, may be employed to effectuate the present invention without departing from the spirit and scope thereof.

In the foregoing description, it can be seen that the present invention comprises a new and useful method and mechanism by which a licensor 62 can 'provision' a packager 60 to package content 12 for publishing, by which the packager 60 in fact packages the content 12 for publishing, and by which a license 16 for the packaged content 13 is obtained by a user. It should be appreciated that changes could be made to the embodiments described above without departing from the inventive concepts thereof. Examples of such changes include the following.

The present invention although disclosed above in terms of content 12 with a rights label 72 could also be implemented in terms of content 12 with a header containing information similar to that disclosed as being in the rights label 72. In addition, although disclosed above in terms of content 12 separate from a license 16, the present invention could also be implemented in terms of content 12 having a license 16 incorporated thereinto. Further, although the licensor 62 is disclosed herein as both provisioning the packager 60 and issuing a license 16 to the user 64, the present invention could also be implemented with one entity provisioning the packager 60 and another entity issuing the license 16 to the user 64, assuming the license issuing entity has access to the provisioning information created by the provisioning entity.

Of course, provisioning as disclosed herein can be employed for purposes other than for publishing. For example, a user can be provisioned to access content 12 already on media such as a portable media. In this case, the user acquires one or more licenses 16 with symmetric keys that allow mapping into a key table on the portable media. Another example is for Enterprise Software License Managers, which are services set up within a corporation or other logical entity that issue software licenses to other devices. A root/hub license manager could be provisioned to issue a certain number of software licenses to down-level computers.

It should be understood, therefore, that this invention is not limited to the particular embodiments disclosed, but it is intended to cover modifications within the spirit and scope of the present invention as defined by the appended claims.

The invention claimed is:

1. A method in combination with a digital rights management architecture wherein a packager packages digital content for a user and a licensor issues a digital license to the user for the content, the user rendering the content only in accordance with the license, the method for the licensor to provision the packager to package the content for the user such that the licensor can issue the license to the user and comprising:

receiving a provisioning request from the packager;
generating a Secret to be shared with the packager, the shared Secret allowing each to calculate a content key (KD) for the content;
generating a random content key (KD-PROV);
encrypting the Secret according to (KD-PROV) to form (KD-PROV(Secret));
signing a public key of the packager (PU-PA1) with a private key of the licensor (PR-LI) to certify same ((PU-PA1) S (PR-LI)), the packager having a corresponding private key (PR-PA1) and the licensor having a corresponding public key (PU-LI); and
sending (KD-PROV(Secret)), (PU-PA1) S (PR-LI), and any associated certificate chain to the packager.

2. The method of claim 1 further comprising generating (PU-PA1, PR-PA1) for the packager, and encrypting (PR-PA1) according to (KD-PROV) to form (KD-PROV(PR-PA1)), the method comprising sending (KD-PROV(Secret)), (KD-PROV(PR-PA1)), (PU-PA1) S (PR-LI), and any associated certificate chain to the packager.

3. The method of claim 1 comprising receiving a provisioning request from the packager including (PU-PA1).

4. The method of claim 1 comprising receiving the provisioning request including proposed business rules specifying conditions under which the user is to be granted the license for the content packaged by the packager.

5. The method of claim 1 further comprising performing a financial transaction with the packager to provision same.

6. The method of claim 1 comprising sending (KD-PROV (Secret)), (PU-PA1) S (PR-LI), and any associated certificate chain to the packager as provisioning content renderable by the packager only in accordance with a corresponding provisioning license.

7. The method of claim 6 comprising receiving the provisioning request including a public key associated with the packager (PU-PA2), the packager having a corresponding private key (PR-PA2), the method further comprising generating the provisioning license by encrypting (KD-PROV) with (PU-PA2) to form (PU-PA2(KD-PROV)), and sending the provisioning license to the packager.

8. The method of claim 7 wherein (PU-PA2, PR-PA2) are (PU-PA1, PR-PA1).

9. The method of claim 7 wherein (PU-PA2, PR-PA2) are different from (PU-PA1, PR-PA1).

10. The method of claim 7 further comprising generating a provisioning content ID and appending same to the provisioning license.

11. The method of claim 10 further comprising appending the generated provisioning content ID to the provisioning content.

12. The method of claim 10 wherein the provisioning content ID includes an identifier of the licensor.

13. The method of claim 7 further comprising specifying usage rules for using the provisioning license and appending same to the provisioning license.

14. The method of claim 1 further comprising storing provisioning information including (PU-PA1) and the shared Secret, the stored provisioning information to be employed when constructing the license for the user.

15. A method in combination with a digital rights management architecture wherein a packager packages digital content for a user and a licensor issues a digital license to the user for the content, the user rendering the content only in accordance with the license, the packager having provisioning content from the licensor including a shared Secret encrypted according to a random content key (KD-PROV) ((KD-PROV(Secret))); and a provisioning license from the licensor including (KD-PROV) encrypted according to a public key of the packager (PU-PA2) ((PU-PA2(KD-PROV))), the method for the packager to package the content for the user such that the licensor can issue the license to the user and comprising:
    selecting the provisioning license and provisioning content from the licensor;
    obtaining (PU-PA2(KD-PROV)) from the provisioning license;
    applying a corresponding private key of the packager (PR-PA2) to (PU-PA2(KD-PROV)) to result in (KD-PROV);
    obtaining (KD-PROV(Secret)) from the provisioning content;
    applying (KD-PROV) to (KD-PROV(Secret)) to result in the shared Secret;
    generating a random content ID for the content;
    calculating a content key (KD) based on the random content ID and the Secret;
    encrypting the content according to, (KD) ((KD(Content)));
    obtaining from one of the provisioning license and the provisioning content a provisioning content ID having an identifier of the licensor;
    appending to (KD(Content)) the random content ID, a public key of the packager (PU-PA1), and the identifier of the licensor to form the packaged content; and
    distributing the packaged content to the user.

16. The method of claim 15 wherein the provisioning license further includes usage rules for using the provisioning license, the method further comprising reviewing the usage rules and making a determination based on such usage rules that (KD-PROV) can be made available from the provisioning license.

17. The method of claim 15 comprising calculating the content key (KD) based on a hash of the random content ID and the Secret.

18. The method of claim 15 wherein the provisioning content includes a signature based on a private key of the licensor (PR-LI) to certify same (S (PR-LI)), and any associated certificate chain, the method further comprising traversing the certificate chain to obtain (PU-LI) and applying same to verify S (PR-LI).

19. The method of claim 15 further comprising appending a signature to (KD(Content)), the signature being based on at least one of the random content ID, the public key of the packager (PU-PA1), the identifier of the licensor, and any usage rules specifying how the user can render the content as packaged.

20. The method of claim 15 wherein (PU-PA2) is (PU-PA1).

21. The method of claim 15 wherein (PU-PA2) is different from (PU-PA1).

22. The method of claim 15 further comprising appending to (KD(Content)) any usage rules specifying how the user can render the content as packaged to form the packaged content.

23. A method in combination with a digital rights management architecture wherein a packager packages digital content for a user and a licensor issues a digital license to the user for the content, the user rendering the content only in accordance with the license, the packaged content including the content encrypted according to a content key (KD) ((KD(Content))), a content ID, and a public key of the packager (PU-PA1), the method for the licensor to issue the license to the user and comprising:
    receiving a request for a license from the user, the request including the content ID, (PU-PA1), and a public key associated with the user (PU-US) that is to be employed to bind the license to the user, the user having a corresponding private key (PR-US);
    obtaining based on (PU-PA1) stored provisioning information regarding the packager including a Secret shared therewith;
    calculating (KD) based on the content ID received with the request and the obtained Secret;
    encrypting (KD) according to (PU-US) as received with the request ((PU-US(KD)));
    appending to (PU-US(KD)) the content ID to form the license; and
    sending the license to the user.

24. The method of claim 23 comprising calculating the content key (KD) based on a hash of the random content ID and the Secret.

25. The method of claim 23 comprising receiving the request further including usage rules specifying how the user can render the content; and
    further comprising appending to (PU-US(KD)) the usage rules.

26. The method of claim 23 comprising receiving (PU-US) in an identifying certificate, and any associated certificate chain.

27. The method of claim 23 wherein the packaged content further includes a signature based on a private key of the packager (PR-PA1) corresponding to the public key of the packager (PU-PA1) ((S(PR-PA1))), the method comprising receiving the request further including (S(PR-PA1)) and verifying (S(PR-PA1)) with (PU-PA1).

28. The method of claim 23 further comprising performing a financial transaction with the user to license same.

29. The method of claim 23 comprising calculating the content key (KD) based on a hash of the random content ID and the Secret.

30. The method of claim 23 further comprising appending to (PU-US(KD)) a signature based on a private key of the licensor (S (PR-LI)), and a corresponding public key of the licensor (PU-LI) to verify same.

* * * * *